Patented Sept. 14, 1948

2,449,149

UNITED STATES PATENT OFFICE 2,449,149

PLASTICIZED AND STABILIZED CELLULOSE COMPOUND AND A PROCESS OF MAKING IT

Ovid Santoro, Bloomfield, and Edwin Jaskot, Passaic, N. J., assignors to Celanese Corporation of America, a corporation of Delaware No Drawing. Application December 27, 1944, Serial No. 570,042

17 Claims. (Cl. 106—182)

This invention relates to thermoplastic compositions, and relates more particularly to the preparation of thermoplastic molding compositions of increased stability and having a basis of cellulose acetate or other organic derivative of cellulose.

An object of this invention is to provide improved thermoplastic molding compositions having a basis of cellulose acetate or other organic derivative of cellulose having increased stability when subjected to operations involving the use of heat.

Another object of this invention is the provision of cellulose acetate or other organic derivative of cellulose molding compositions which are highly resistant to discoloration and other detrimental changes when molded at elevated temperatures and pressures.

Other objects of this invention will appear from the following detailed description.

While our invention will be more particularly described in connection with the preparation of improved cellulose acetate molding compositions, it is to be understood, of course, that equally desirable results are obtained when our invention is practiced in connection with molding compositions having a basis of other organic acid esters of cellulose such as cellulose propionate and cellulose butyrate, mixed esters such as cellulose acetate-propionate and cellulose acetate-butyrate and cellulose ethers such as ethyl cellulose and benzyl cellulose. Moreover, our invention is also applicable to the preparation of film, foil, sheets, rods, tubes and similar articles made by methods employing solvents and relatively much lower temperatures than prevail in molding, extrusion and like processes. For example, film and foil made by casting at room temperature may be exposed to high temperatures in use and therefore may beneficially have incorporated therein a heat stabilizer.

In molding thermoplastic compositions having a basis of cellulose acetate, it has been found most desirable to incorporate various plasticizers in the molding compositions in order to obtain improved molding properties and satisfactory molded articles. The presence of plasticizers not only lowers the melting point of the cellulose acetate so that it may be molded without employing excessively high temperatures, but, in addition, the correct choice of a plasticizer or combination of plasticizers gives the finished article improved properties such as increased toughness and flexibility, as well as a notable degree of resistance to the action of agents such as water, oil or grease. Such properties may be quite important depending upon the conditions to which the molding materials are subjected. However, the use of certain agents in thermoplastic cellulose acetate compositions has been observed to cause structural and degradation changes in the cellulose acetate, and these changes result in a lowering of the viscosity, or a viscosity breakdown, in the cellulose acetate molding composition, particularly when the latter is subjected to elevated temperatures. For example, while agents such as triphenyl phosphate or phenyl salicylate, which agents exert some softening action on the cellulose acetate, are incorporated in cellulose acetate molding compositions, they produce molded materials of very satisfactory hardness and water resistance characteristics. However, when triphenyl phosphate or phenyl salicylate, or mixtures of these plasticizing agents are combined with cellulose acetate and subjected to the high temperatures necessary for satisfactory molding, not only are the molded articles obtained extremely brittle, but the viscosity-breakdown is often accompanied by the development of an unsatisfactory color in the molded material. It is believed that these detrimental effects are caused by the reaction between the unstable sulphate esters, present in the cellulose acetate due to the use of sulphuric acid as catalyst in the preparation of the cellulose acetate, and the triphenyl phosphate or phenyl salicylate under elevated temperatures. Attempts to eliminate these undesirable effects in molded cellulose acetate materials by purifying the particular plasticizing agents in question or by the use of urea, a well known cellulose nitrate (pyroxylin) stabilizer, have not proven to be satisfactory and continuous efforts have been made to overcome this difficulty.

We have now discovered that the stability of the cellulose acetate, as evidenced by the flexibility and viscosity maintenance of molded cellulose acetate, may be substantially improved by incorporating certain stabilizers in the thermoplastic composition from which these molded materials are prepared. In accordance with the present invention, this improvement is obtained by incorporating certain salts of hydroxy aliphatic carboxylic acids, such as glycolic, gluconic, and preferably lactic acid, in the cellulose acetate composition in amounts of from about 0.1 to about 5% on the weight of the cellulose acetate present in the composition before subjecting the latter to molding operations. The substantial viscosity breakdown and the undesirable development of color and brittleness usually observed after molding cellulose acetate compositions containing triphenyl phosphate and/or phenyl salicylate is substantially overcome by the presence of these novel stabilizing agents. Examples of suitable stabilizing agents are calcium lactate, strontium lactate, barium lactate, magnesium lactate, lithium lactate, sodium lactate, potassium lactate or ammonium lactate. The most desirable results are obtained employing calcium lactate as the stabilizing agent in amounts of from 0.1 to 1% by weight of the cellulose acetate in the composition. Not only is this improvement observed in molded cellulose acetate materials, but like improvement is observed in the flexibility, viscosity, etc., of extruded materials such as, for example, sheets, films, foils, filaments, tubes, rods and other profile shapes normally prepared by extruding a cellulose acetate composition at an elevated temperature and in a thermoplastic condition through a suitably shaped orifice or nozzle.

In preparing the cellulose acetate compositions containing a stabilizing agent comprising an alkali or alkali-earth salt of lactic acid, the desired degree of uniformity or homogeneity of the composition may be obtained by mixing finely divided or pulverized calcium lactate with cellulose acetate in the form of flakes or powder and combining the mixture obtained with a plasticizer or plasticizers, with or without other effect materials such as dyes, pigments, etc. The mixing may be effected in any suitable mixing device such as the Werner Pfleiderer kneader, Banbury mixer, malaxating rolls or similar mixing devices. While the incorporation of the stabilizer may be carried out according to the dry process, i. e., without the use of any volatile solvent, the plasticizer or plasticizers may be dissolved, if desired, in a volatile organic solvent such as, for example, ethyl ether, benzol or alcohol. The volatile solvent is then evaporated from the molding composition. Where plasticizer solvents in which the stabilizing agent is not soluble are employed, the stabilizing agent may be suspended therein and, by providing sufficient agitation, may be homogeneously mixed with the cellulose acetate molding material being treated. Other methods of adding the stabilizer will be apparent to those skilled in the art.

In accordance with our novel process, we are now able to mold thermoplastic compositions having a basis of cellulose acetate with triphenyl phosphate as the only plasticizing agent present yet obtain molded articles entirely free of that brittleness and color normally associated in the art with molded cellulose acetate compositions containing triphenyl phosphate alone, without the presence of any active or solvent type of plasticizer. These results were hitherto considered unattainable.

In accordance with our process, we have obtained molded articles containing up to 25 parts by weight of triphenyl phosphate without having any surface exudation or crystallization thereof even after 48 hours exposure in an atmosphere at 100% relative humidity and at a temperature of 140° F. These results are indeed surprising in view of the poor solvent action or affinity of triphenyl phosphate for cellulose acetate.

The solvent type of plasticizer may, if desired, also be incorporated in the plastic compositions of our invention. As examples of active or solvent plasticizers which may be employed in formulating thermoplastic cellulose acetate molding compositions, in addition to the triphenyl phosphate and/or phenyl salicylate which is present, there may be mentioned tricresyl phosphate, mixed phenyl cresyl phosphates such as diphenyl monocresyl phosphate, diethyl phthalate, methyl phthalyl ethyl glycollate, dimethyl phthalate, triacetin, tripropionin, dimethoxy ethyl phthalate, dibutyl tartrate, dibutyl phthalate, paratoluene ethyl sulfonamide, etc. These plasticizers may comprise from 10 to 50% or more by weight of the cellulose acetate present in the composition.

In lieu of combining the stabilizing agent employed with all of the cellulose acetate and the plasticizers in but a single operation, the stabilizing agent may be homogeneously combined with but a small quantity of cellulose acetate and/or the plasticizers, and this master material may then be combined with the remaining cellulose acetate by conversion on malaxating rolls or in a suitable mixing device.

In order further to illustrate our invention but without being limited thereto, the following examples are given:

Example I 0.5 part by weight of pulverized calcium lactate are mixed with 100 parts by weight of cellulose acetate of 56% acetyl value, calculated as acetic acid, and tumbled together for uniform distribution. 25 parts by weight of triphenyl phosphate dissolved in ethyl ether are combined with the mixture of cellulose acetate and calcium lactate and, after agitation, the ether is evaporated off. When the composition obtained is subjected to injection molding operations at a nozzle temperature of 250° C. and 45 second cycle to form a comb, for example, the molded article obtained is clear and colorless, possesses high flexibility and suffers little loss in viscosity. Such a comb does not evidence on its surface any exudation or crystallization of triphenyl phosphate after exposure for 48 hours in an atmosphere at 100% relative humidity and at a temperature of 140° F. A molded object obtained from the same composition but without the incorporation of calcium lactate is extremely brittle and considerable color develops during the molding operation.

Example II 1.0 part by weight of pulverized calcium lactate is suitably mixed with 100 parts by weight of 56% acetyl value cellulose acetate. To this mixture is added a solution of 40 parts by weight of triphenyl phosphate in benzol, the whole is agitated and the benzol is then evaporated off. On compression molding at 200° C. for 15 minutes, a molded object is obtained possessing very desirable flexibility characteristics without the development of excessive color. The viscosity loss is very low. When a similar molding composition without calcium lactate present is subjected to molding, an extremely brittle product is obtained.

Example III 0.125 part by weight of pulverized calcium lactate are mixed with 100 parts by weight of cellulose acetate and tumbled until uniformly dispersed. 15 parts by weight of diethyl phthalate and 5 parts by weight of triphenyl phosphate are dissolved in ether, combined with the mixture of cellulose acetate and calcium lactate with agitation and the ether is evaporated off. The mixture is then dried at 100° C. for 3 hours and molded at 200° C. for 30 minutes to form a molded disc. The viscosity of the original cellulose acetate material was 100 centipoises and after molding is 91 centipoises indicating a viscosity loss of only 9%. The developed color or yellowness coefficient, as indicated by the comparative light transmission of 640 mµ minus that at 440 mµ, divided by the transmission at 640 mµ, is 0.3, which represents a relatively low development of color. A molded disc of the same composition but molded without incorporating calcium lactate in the composition had a viscosity of 11 centipoises showing a viscosity loss of 89%, with the development of more color.

*Example IV*

A cellulose acetate composition is prepared in the manner similar to that described in Example I but containing 0.5 part by weight on the cellulose acetate of calcium lactate. When this composition is molded at 200° C. for 30 minutes the disc shows a yellowness coefficient of 0.45 and a viscosity seven times that of a similar disc made without the use of calcium lactate.

*Example V*

100 parts by weight of cellulose acetate are tumbled with 0.5 part by weight of finely powdered calcium lactate to insure thorough mixing and to this mixture is added an ether solution containing 15 parts by weight of diethyl phthalate and 5 parts by weight of phenyl salicylate. The mixture is thoroughly agitated and the ether is then evaporated off. After the composition is dried, it is subjected to molding at 200° C. for 30 minutes. The disc obtained has a yellowness coefficient of 0.46. The similar composition molded without having calcium lactate present possesses only half the viscosity of the above sample and has a yellowness coefficient of 0.67.

*Example VI*

100 parts by weight of cellulose acetate are tumbled with 0.125 part by weight of finely divided calcium lactate until thoroughly mixed and the mixture is combined with an ether solution containing 15 parts by weight of diethyl phthalate, 15 parts by weight of triphenyl phosphate and 1 part by weight of phenyl salicylate. After mixing, the ether is evaporated off. On molding for 30 minutes at 200° C., the composition yields a molded disc with a yellowness coefficient of 0.52. A composition molded without calcium lactate retains but one fourth of the after-molding viscosity of the aforementioned disc and a yellowness coefficient of 0.63, showing the substantial improvement obtained employing calcium lactate as the stabilizing agent.

The viscosity of the materials is determined by a standardized procedure. The procedure comprises weighing three grams of the recovered cellulose acetate, dried at 100° C. for one hour, in a wide mouth bottle, adding 50 cc. of 95/5 acetone/water, by weight, agitating until solution is complete, and transferring 20 cc. of the solution to an Ostwald viscometer. The efflux time in seconds at 25° C. is measured with a stop watch and the viscosity expressed in seconds is calculated to centipoises. The desired comparison is obtained by determining the viscosity of the material in question with and without calcium lactate after molding and the difference is, of course, a measure of the viscosity-breakdown.

It is to be understood that the foregoing detailed description is given merely by way of illustration and that many variations may be made therein without departing from the spirit of our invention.

Having described our invention, what we desire to secure by Letters Patent is:

1. A thermoplastic composition of matter comprising a cellulose derivative, selected from the group consisting of lower aliphatic acid esters of cellulose and cellulose ethers, and at least one plasticizer selected from the group consisting of triphenyl phosphate and phenyl salicylate, said composition being stabilized by having incorporated therein from 0.1 to about 5%, based on the weight of the cellulose derivative, of a salt selected from the group consisting of alkali metal and alkali-earth metal salts of hydroxy aliphatic mono carboxylic acids.

2. A thermoplastic composition of matter comprising a cellulose derivative, selected from the group consisting of lower aliphatic acid esters of cellulose and cellulose ethers, and at least one plasticizer selected from the group consisting of triphenyl phosphate and phenyl salicylate, said composition being stabilized by having incorporated therein from 0.1 to about 5%, based on the weight of the cellulose derivative, of a salt selected from the group consisting of alkali metal and alkali-earth metal salts of lactic acid.

3. A thermoplastic composition of matter comprising cellulose acetate and triphenyl phosphate, said composition of matter being stabilized by having incorporated therein from 0.1 to about 5%, based on the weight of the cellulose acetate of a salt selected from the group consisting of alkali metal and alkali-earth metal salts of lactic acid.

4. A thermoplastic composition of matter comprising cellulose acetate, at least one plasticizer for said cellulose acetate selected from the group consisting of triphenyl phosphate and phenyl salicylate, and from 0.1 to about 5%, based on the weight of the cellulose acetate, of a stabilizing agent selected from the group consisting of alkali metal and alkali earth-metal salts of lactic acid.

5. A thermoplastic composition of matter comprising cellulose acetate, at least one plasticizer for said cellulose acetate selected from the group consisting of triphenyl phosphate and phenyl salicylate, and as stabilizing agent from 0.1 to 1%, based on the weight of the cellulose acetate, of calcium lactate.

6. A molded article, having a basis of a cellulose derivative selected from the group consisting of lower aliphatic acid esters of cellulose and cellulose ethers, having incorporated therein a plasticizer selected from the group consisting of triphenyl phosphate and phenyl salicylate and from 0.1 to about 5%, based on the weight of the cellulose derivative, of a salt selected from the group consisting of alkali metal and alkali-earth metal salts of hydroxy aliphatic monocarboxylic acids.

7. A molded article comprising cellulose acetate having incorporated therein phenyl salicylate as plasticizer and calcium lactate, said calcium lactate being present in an amount which substantially overcomes the detrimental effect of said phenyl salicylate.

8. A molded article comprising cellulose acetate having incorporated therein triphenyl phosphate as plasticizer and calcium lactate as stabilizing agent, said calcium lactate being present in an amount of from 0.1 to 1% by weight of the cellulose acetate.

9. A molded article comprising cellulose acetate having incorporated therein phenyl salicylate as plasticizer and calcium lactate as stabilizing agent, said calcium lactate being present in an amount of from 0.1 to 1% by weight of the cellulose acetate.

10. Process for the production of a stable thermoplastic molding composition having a basis of a cellulose derivative, selected from the group consisting of lower aliphatic acid esters of cellulose and cellulose ethers, and containing at least one plasticizer therefor selected from the group consisting of triphenyl phosphate and phenyl salicylate, which comprises mixing dry cellulose derivative, selected from the group consisting of lower aliphatic acid esters of cellulose and cellulose ethers, with from 0.1 to about 5%, based on the weight of the cellulose derivative, of a stabilizing agent selected from the group consisting of alkali metal and alkali-earth metal salts of lactic acid, adding to the said mixture a solution of the plasticizer in a volatile solvent having substantially no solvent action on the said cellulose derivative, and removing the volatile solvent from the resulting composition.

11. Process for the production of a stable thermoplastic molding composition having a basis of cellulose acetate and containing at least one plasticizer therefor selected from the group consisting of triphenyl phosphate and phenyl salicylate, which comprises mixing dry cellulose acetate with from 0.1 to about 5%, based on the weight of the cellulose acetate, of a stabilizing agent selected from the group consisting of alkali metal and alkali-earth metal salts of lactic acid, adding to the said mixture a solution of the plasticizer in a volatile solvent having substantially no solvent action on the said cellulose acetate, and removing the volatile solvent from the resulting composition.

12. Process for the production of a stable thermoplastic molding composition having a basis of cellulose acetate, and containing at least one plasticizer therefor selected from the group consisting of triphenyl phosphate and phenyl salicylate, which comprises mixing dry cellulose acetate with from 0.1 to about 5%, based on the weight of the cellulose acetate, of calcium lactate, adding to the said mixture a solution of the plasticizer in a volatile solvent having substantially no solvent action on the said cellulose acetate, and removing the volatile solvent from the resulting composition.

13. Process for the production of a stable thermoplastic molding composition having a basis of cellulose acetate and containing at least one plasticizer therefor including a member selected from the group consisting of triphenyl phosphate and phenyl salicylate, which comprises mixing the dry cellulose acetate with calcium lactate, as stabilizing agent in an amount of from 0.1 to 1% by weight of the cellulose acetate, adding to said mixture a solution of the plasticizer in a volatile solvent having substantially no solvent action on the cellulose acetate, and removing the volatile solvent from the resulting composition.

14. Process for the production of a stable thermoplastic molding composition having a basis of cellulose acetate and containing triphenyl phosphate as a plasticizer therefor, which comprises mixing dry cellulose acetate with calcium lactate in an amount of from 0.1 to 1% by weight of the cellulose acetate, adding to said mixture a solution of triphenyl phosphate in a volatile solvent having substantially no solvent action on the cellulose acetate, and removing the volatile solvent from the resulting composition.

15. Process for the production of a stable thermoplastic molding composition having a basis of cellulose acetate and containing phenyl salicylate as a plasticizer therefor, which comprises mixing dry cellulose acetate with calcium lactate in an amount of from 0.1 to 1% by weight of the cellulose acetate, adding to said mixture a solution of phenyl salicylate in a volatile solvent having substantially no solvent action on the cellulose acetate, and removing the volatile solvent from the resulting composition.

16. Process for the production of a stable thermoplastic molding composition having a basis of cellulose acetate and containing triphenyl phosphate as a plasticizer therefor, which comprises mixing dry cellulose acetate with calcium lactate in an amount of from 0.1 to 1% by weight of the cellulose acetate, adding to said mixture a solution comprising triphenyl phosphate dissolved in ether, and removing said ether from the resulting composition.

17. Process for the production of a stable thermoplastic molding composition having a basis of cellulose acetate and containing phenyl salicylate as a plasticizer therefor, which comprises mixing dry cellulose acetate with calcium lactate in an amount of from 0.1 to 1% by weight of the cellulose acetate, adding to said mixture a solution comprising phenyl salicylate dissolved in ether, and removing said ether from the resulting composition.

OVID SANTORO.
EDWIN JASKOT.

REFERENCES CITED

The following references are of record in the file of this patent:

UNITED STATES PATENTS

| Number | Name | Date |
|---|---|---|
| 1,319,229 | Lindsay | Oct. 21, 1919 |
| 2,079,643 | Whitehead | May 11, 1937 |
| 2,154,822 | Quisling | Apr. 18, 1939 |
| 2,191,895 | Meigs | Feb. 27, 1940 |
| 2,202,041 | Altwegg et al. | May 28, 1940 |
| 2,223,893 | Lohmann | Dec. 3, 1940 |